Patented Aug. 24, 1937

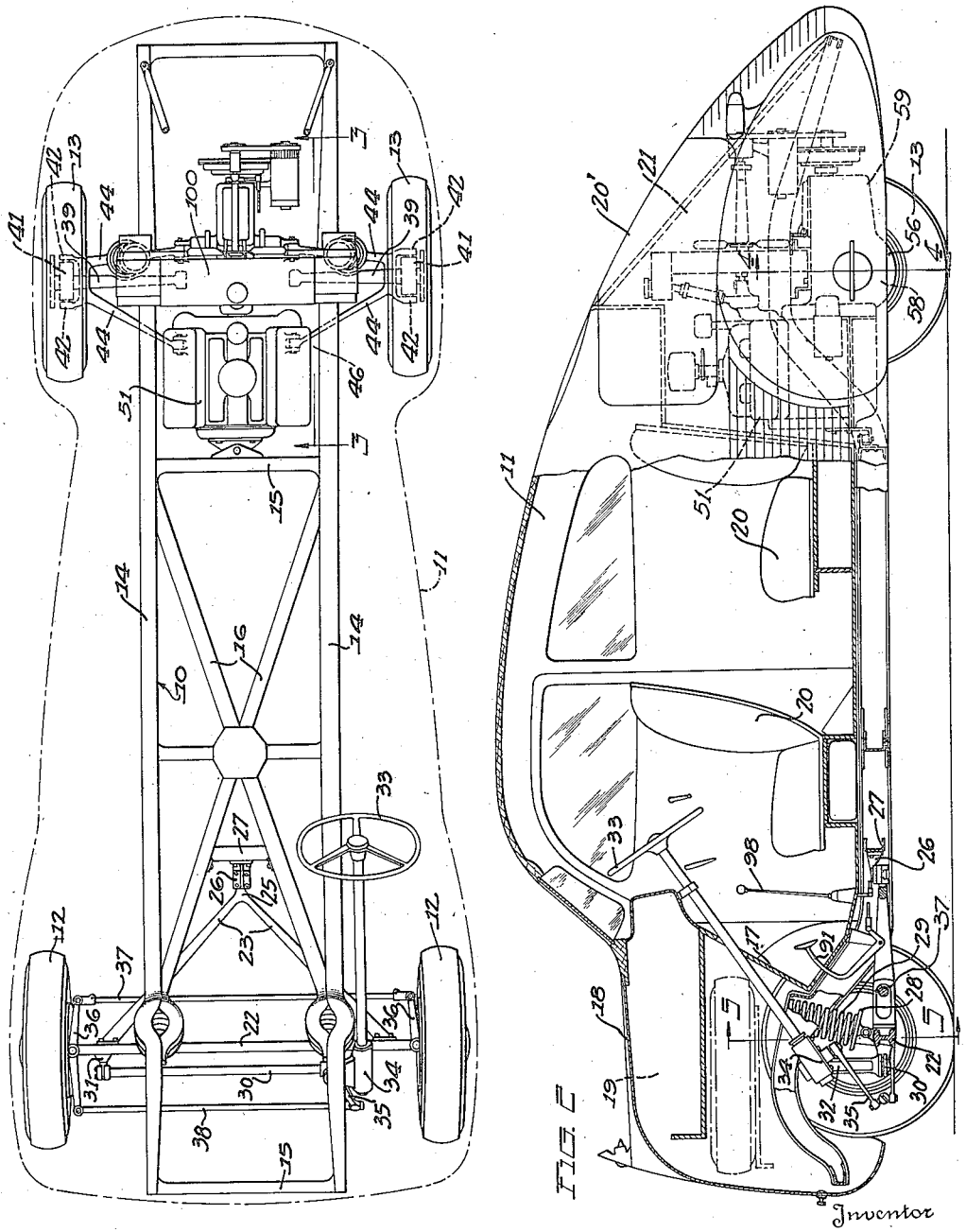

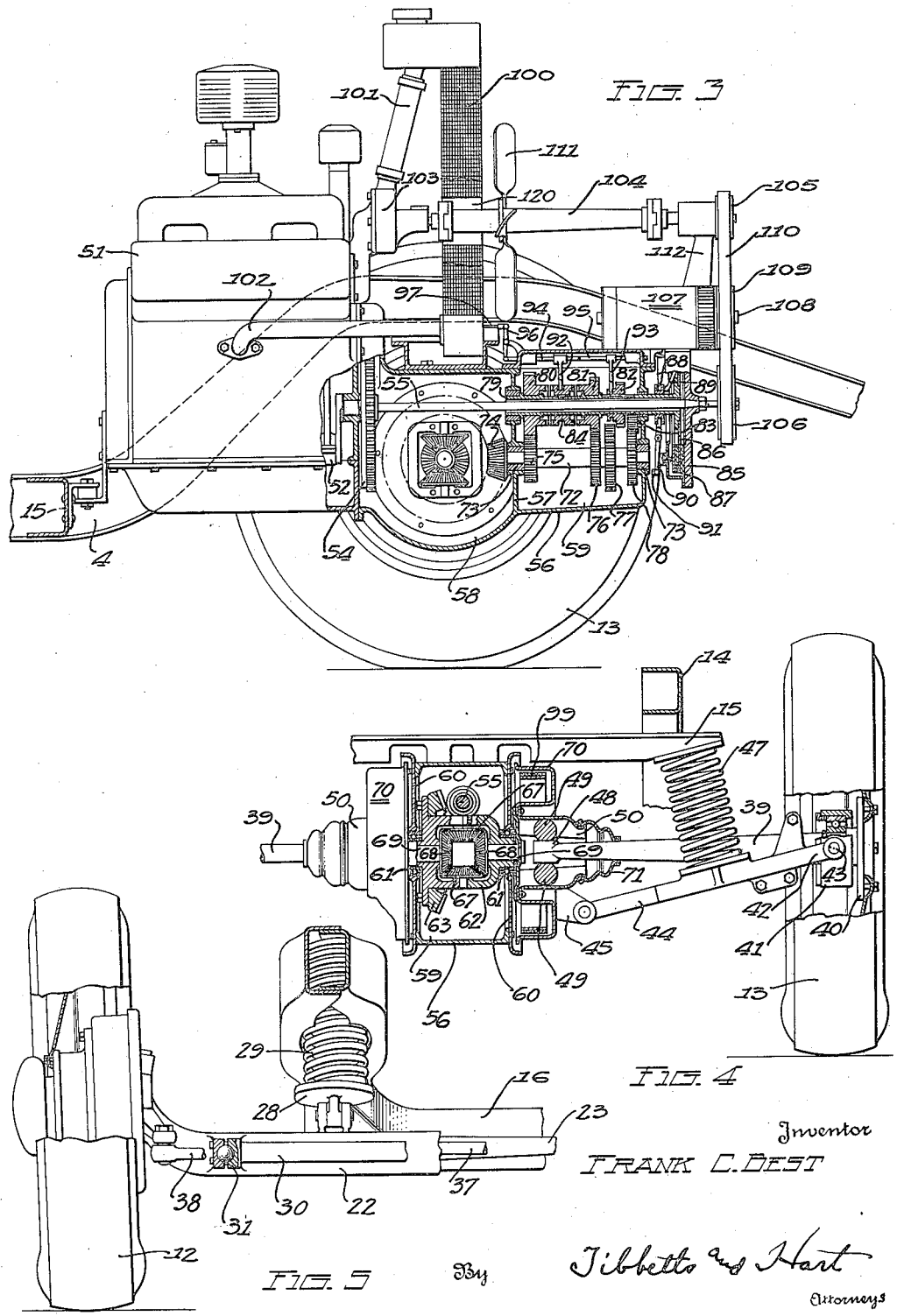

2,090,721

UNITED STATES PATENT OFFICE 2,090,721

MOTOR VEHICLE

Frank C. Best, Detroit, Mich., assignor to Packard Motor Car Company, Detroit, Mich., a corporation of Michigan Application May 27, 1935, Serial No. 23,614

6 Claims. (Cl. 180—54)

This invention relates to motor driven vehicles and more particularly to the type of vehicles in which the power plant and the drive mechanism are located adjacent the rear end.

An object of the invention is to provide a power driving mechanism for vehicles which is compactly arranged behind the passenger compartment.

Another object of the invention is to provide a rear transmission mechanism for driving the rear axles of a motor vehicle in which the drive is transmitted directly from the lay shaft to the differential mechanism.

A further object of the invention is to provide independent suspension for the drive wheels of a motor vehicle arranged to restrain the side movement of the wheel treads within small limits while rising and falling relative to the frame.

Still another object of the invention is to provide a compact positive drive for the accessories of an engine located at the rear of a motor vehicle whereby the number of parts required and manufacturing costs are minimum.

Other objects of the invention will appear from the following description taken in connection with the drawings, which form a part of this specification, and in which:

Fig. 1 is a plan view of a motor vehicle chassis having my invention incorporated therewith.

Fig. 2 is a side elevational view of the same, partly broken away and partly in section.

Fig. 3 is a vertical sectional view taken substantially on line 3—3 of Fig. 1, parts of the engine, axle, and transmission housing being broken away.

Fig. 4 is a sectional view taken on line 4—4 of Fig. 2, showing the drive axle and the suspension of one of the rear wheels.

Fig. 5 is a sectional view taken on line 5—5 of Fig. 2, showing one end of the front suspension.

The motor vehicle illustrated includes a frame 10, a body 11, front steering wheels 12 and rear driving wheels 13. The frame consists of side rails 14 suitably joined together by transversely extending members 15 and an X-member 16. In the body is a dash 17, a cowl 18 enclosing a storage chamber 19 and a passenger compartment in which seats 20 are arranged. At the rear of the passenger compartment is another compartment 21 for housing the power unit and the drive mechanism, such compartment having a top opening closed by hinged cover means 20'. With this arrangement of the power plant and drive mechanism, the noise, fumes, heat and vibration will be behind the occupants of the body so that they are less noticeable than with the conventional front arrangement. The weight at the rear of the vehicle is balanced longitudinally by the forward location of the occupants of the body and the contents of the storage chamber.

The front wheels are connected with the frame by a novel form of suspension associated with a transversely extending axle 22. At the rear of this axle is a V-shaped radius member having the angularly disposed arms 23 fixed to the end portions of the axle and an apex arm 25 pivotally supported in a bracket 26 fixed on a portion 27 of the X-brace frame member. Pivoted on the axle are seat members 28 for receiving coil springs 29 which at their other ends bear against the frame 10. A rod 30 parallels a front portion of the axle and is pivoted thereto at one end by a bracket 31. The other end of the rod is pivotally connected with an arm 32 depending from and fixed to the frame 10, such rod anchoring the axle with the frame to prevent displacement in transverse and longitudinal directions. The radius member 23 and the rod 30 allow the axle to rise and fall with the wheels in an anchored relation with the frame.

Extending through the dash 17 is a conventional steering column in which is a shaft having a steering hand wheel 33 fixed to one end thereof. The other end of the shaft extends into a housing 34 carrying conventional gearing for rocking the arm 35. Arms 36 are fixed to the front wheel hubs and are connected by a tie rod 37, the arm 36 at the right side of the vehicle being connected with the arm 35 by a rod 38. As the steering wheel is rotated the gearing in the housing rocks the arm 35 transversely of the vehicle and similar motion is transmitted to the rod 38. The movement of this rod is transmitted to one of the arms 36 and to the other arm 36 by means of tie rod 37.

The rear wheels are connected with the frame by a novel form of suspension. An axle section 39 extends to each rear wheel from the differential and the hubs of the wheels 40 are fixed to the outer ends of such shafts. Rotatably mounted on each axle is a carrier 41 to which two arms 42 of a link member are pivoted by pins 43. These link members also have two arms 44, one of which is pivotally connected to bracket 45 on the transmission casing and the other of which is pivotally connected to bracket 46 extending beneath the engine. Between one of the arms 44 of each link member and the frame thereabove is arranged a coil spring 47. The inner ends 48 of the axle sections are formed with bearings 49 slidably and rockably mounted in grooves formed in drive shafts 50. The link members extend upwardly from the brackets 45 and 46 and the coil springs 47 are arranged axially in a relation normal to the associated link arm 44. The driving axles 39 extend normally substantially in a horizontal plane and they are mounted in the driving shafts intermediate the inner pivotal points of the opposite link members. The pivots of the arms 44 of each link member are respectively arranged in alignment longitudinally of the vehicle. The axles 39 and the link members serve to control the relation of the wheels in their up and down movement and the relation of the link members relative to the axles reduces the arcuate movement of the wheels as they would normally swing on the bearings 49 in their up and down travel. In other words, the link members cooperate with the axles to hold the ground engaging portion of the wheels in a narrow path transversely of the vehicle during their up and down movement.

At the rear of the body compartment and substantially entirely within the compartment 21 is arranged a power plant and drive mechanism. In the forward end of this compartment is arranged the power plant 51 which in this instance is an internal combustion engine. On the rear end of the crank shaft 52 is fixed a relatively thin flywheel 54 from which extends rearwardly a driving shaft 55. This shaft and the drive mechanism associated therewith is mounted within a casing 56 having a partition 57 defining a differential compartment 58 and a transmission compartment 59. The sides of the casing 56 providing the differential compartment are formed with openings which are closed by cover plates 60. These cover plates are formed with bearings 61 for receiving the ends of the differential spider 62 to which the ring gear 63 is fixed. Within the spider are mounted pinions 67 which mesh with pinions 68 fixed to shafts 69 extending through the openings in the covers 60. Fixed on these shafts 69 are brake drums 70 and the driving shafts 50 in which the axles 39 are mounted. A suitable closure 71 surrounds each axle and is secured to the outer end of the driving shaft 50.

Within the transmission compartment 59 is arranged a change speed mechanism of a novel form. A lay shaft 72 is mounted in bearings 73 provided in the rear end wall of the casing and in the partition 57 and on the forward end of this shaft, within the differential compartment, is a driving pinion 74 which meshes with the gear 63. Fixed on, or formed with, the lay shaft are driving gears 75, 76, 77 and 78. Telescoping the driving shaft and rotatably mounted thereon in the compartment 59 is a sleeve 79. On this sleeve is fixed a gear 80 meshing with the gear 75, a gear 81 meshing with the gear 76, and a positive clutch member 82 is slidably keyed on such sleeve. This clutch 82 is adapted to be shifted into mesh with the gear 77 or with a gear 83, which is in mesh with the gear 78. When the clutch 82 is shifted to mesh with the gear 83, the shaft 72 will be driven so that it operates to drive the vehicle rearwardly. When the clutch 82 is shifted to mesh with the gear 77 then the shaft 72 is driven to move the vehicle forwardly in its lowermost speed range. Intermediate the gears 80 and 81 a positive clutch member 84 is slidably keyed on the sleeve so that it can be shifted into engagement with either of the adjacent gears. When this clutch is shifted to positively engage the gear 81 then the gear 76 drives the shaft 72 so that the vehicle is moved forwardly in its intermediate speed range. When the clutch 84 engages the gear 80 then the gear 75 drives the shaft 72 so that the vehicle is moved forward at high speed range.

A clutch mechanism is provided between the rear portion of the shaft 55 and the sleeve 79, such clutch being of conventional form except that the positive portion 85 is formed to also serve as a flywheel. By providing this form of flywheel clutch section, the forward flywheel 54 can be made thinner thus allowing the engine to be disposed farther to the rear of the vehicle. The driven section of the clutch 86 is fixed to the sleeve 79 and is normally held engaged with the positive clutch section by friction plates 87. A clutch collar 88 is slidably mounted on the sleeve 79 and engages fingers 89 which are associated with the mechanism to release the clutch so that the drive is broken between the shaft 55 and the sleeve 79.

The clutch collar is shifted by a lever 90 to which is fixed mechanism extending forwardly of the vehicle for attachment to a pedal 91, such clutch operating mechanism being conventional in design. An arm 92 is associated with the clutch member 84 and an arm 93 is associated with the clutch member 82, these arms being each mounted upon shifter rods 94 and 95, respectively. Associated with the shifter rods is a control mechanism, of a conventional type, including a lever 96 having operating mechanism 97 extending forwardly to the shift lever 98 arranged to be conveniently operated by the driver. Associated with the drums 70 are brake bands, as indicated at 99, which are contracted and expanded in a conventional manner by suitable mechanism extending within the convenient reach of the driver of the vehicle.

It will be noted that none of the engine accessories are associated with the forward end of the engine and as a consequence the body passenger compartment can be located well toward the rear wheels. It will also be noted that the engine and transmission mechanism are arranged on opposite sides of the driving shafts, as viewed longitudinally of the vehicle, and thus the engine and the transmission mechanism serve to more or less balance each other. The radiator 100 is located substantially directly above the differential compartment and conduit means 101 and 102 connect the radiator with the fluid cooling system in the engine. In the housing 103 with which the radiator inlet conduit 101 is connected is arranged a pump for circulating water through the cooling system and a drive shaft means 104 extends rearwardly from the pump in parallel relation with the drive shaft 55. At the end of this shaft means 104 is fixed a pulley 105 which is in vertical alignment with a pulley 106 fixed on the rear end of the shaft 55. A generator 107 is fixed on the transmission casing and a shaft 108 extends rearwardly therefrom and has fixed thereon a pulley 109 which aligns vertically with the pulleys 105 and 106, and around these pulleys extends a driving belt 110. Fixed on the shaft means 104 rearwardly of the radiator is a fan 111.

The arrangement of accessories and their driving means just described provides for a compact structure which can be formed with a minimum number of parts at a relatively low cost. It will be noted that the shaft means 104 is fixed to both the water pump and fan and that such shaft means extends through an opening 120 formed in the radiator core. The fan is located at the rear of the radiator and by such location air will be moved through the radiator core more efficiently than if the fan were located in advance of the core. It will also be noted that the drive shaft means 104 and the generator shaft 108 are both driven by a single belt from the drive shaft 55 and as the pulley 106 is driven by the shaft 55 release of the clutch will not discontinue operation of the accessories driven by the pulley. The shaft means 104 can be formed in sections and the outer end is carried by bracket 112 extending upwardly from the transmission housing.

It will be noted that the driving mechanism and accessory arrangement require a minimum number of parts and are located at the rear of the passenger compartment to allow increased area therein. The rear wheel suspension utilizes the drive axles as part of the wheel mounting and a single universal joint is required with each mounting.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a motor vehicle, power transmission mechanism comprising an engine crank shaft, a driving shaft extending rearwardly from said crank shaft and connected to be driven directly therefrom, a sleeve shaft telescoping a portion of said driving shaft, a clutch mechanism for connecting and disconnecting said sleeve shaft and said driving shaft, an axle means extending transversely of the vehicle in advance of said sleeve shaft, differential gearing associated with said axle means, a lay shaft geared at one end to said differential gearing and in the same horizontal plane therewith, and change speed gearing adapted to transmit power from said sleeve shaft to said lay shaft when said clutch mechanism is engaged.

2. In a motor vehicle, the combination of an engine having a crank shaft, a main drive shaft extending rearwardly from and fixed to rotate with the crank shaft, clutch means having an element fixed to an intermediate portion of said drive shaft for actuating road wheel driving mechanism, engine accessory drive shafts, and a positive driving connection between the rear end of said main drive shaft and said accessory drive shafts.

3. In a motor vehicle, the combination of an engine having a crank shaft, a main drive shaft extending rearwardly from and fixed to rotate with the crank shaft, clutch means having an element fixed to an intermediate portion of said main drive shaft for actuating road wheel driving mechanism, a generator shaft, a fan shaft, said shafts being substantially parallel with said main drive shaft, and a positive driving connection between the rear end of said main drive shaft and the generator and fan shafts.

4. In a motor vehicle, the combination of an engine having a crank shaft, a transmission housing fixed to the rear end of the engine, a radiator supported on said transmission housing and having a fluid connection with the engine, a drive shaft fixed to the rear end of the crank shaft and projecting through the transmission casing, a driven shaft parallel with the drive shaft and extending through the radiator, a pump in the fluid connection fixed to the driven shaft in advance of the radiator, a fan fixed to the driven shaft behind the radiator, and a driving connection from the end of the drive shaft projecting through the casing to the driven shaft.

5. In a motor vehicle, power transmission mechanism comprising an engine crank shaft, a driving shaft extending rearwardly from said crank shaft and connected to be driven directly therewith, a sleeve shaft telescoping a portion of said driving shaft, clutch mechanism for connecting and disconnecting said sleeve shaft and said driving shaft, an axle means extending transversely of the vehicle in advance of said sleeve shaft, differential gearing associated with said axle means, a lay shaft geared at one end to said differential gearing and in the same plane therewith, gears slidably splined on said sleeve shaft, gears fixed on said lay shaft and adapted to be engaged by the slidable gears on said sleeve shaft to drive the differential gearing at different speeds relative to the driving shaft when the clutch mechanism is engaged, and means for shifting the gears on said sleeve shaft.

6. In a motor vehicle, a power transmission mechanism comprising an engine crank shaft, a driving shaft extending rearwardly from said crank shaft and fixed to be driven directly therefrom, a sleeve shaft telescoping a portion of said driving shaft and rotatably mounted relative thereto, clutch mechanism rearwardly of said sleeve shaft adapted to connect said sleeve shaft directly with said driving shaft when engaged, accessory drive means fixed on said driving shaft rearwardly of said clutch, an axle means extending transversely of the vehicle in advance of said sleeve shaft including a differential gearing, a lay shaft geared at its forward end to said differential gearing and in the same plane therewith, and change speed gearing adapted to transmit power from said sleeve shaft to said lay shaft when said clutch mechanism is engaged.

FRANK C. BEST.